United States Patent Office 3,005,830
Patented Oct. 24, 1961

3,005,830
STABILIZED BUTYROLACTONE COMPOSITIONS AND METHODS FOR MAKING SAME
Eugene V. Hort, Westfield, and Frederick Grosser, Midland Park, N.J., assignors to General Aniline & Film Corporation, New York, N.Y., a corporation of Delaware
No Drawing. Filed Aug. 31, 1959, Ser. No. 836,861
8 Claims. (Cl. 260—343.6)

This invention relates to methods for stabilizing butyrolactone, and particularly to the stabilization thereof against color formation due to heat, and to the stabilized butyrolactone per se by the addition to the butyrolactone of minor amounts of formaldehyde.

Butyrolactone as a commercially salable product is a substantially colorless liquid that is water white, which has a boiling point at atmospheric pressure of about 204° C. This compound is completely miscible with water, methanol, acetone, benzene, carbon tetrachloride, diethyl ether and monochloro benzene. It is a non-toxic, non-corrosive, chemically stable liquid which has outstanding commercial utility in various fields. In addition to the usual uses as an intermediate for the manufacture of various other compounds, e.g., hydroxy butyric acid, pyrrolidone, methionine, 2,4-dichlorophenoxy butyric acid, etc. butyrolactone has achieved outstanding prominence as a solvent for certain selected plastic and resinous materials, some of the latter very difficultly soluble in most available solvent systems. Thus, butyrolactone is an excellent solvent for polyacrylonitrile, cellulose triacetate, polystyrene, shellac, etc. In most commercial applications it is deemed desirable that the butyrolactone remain as a water white material. For many uses this is not essential as in the instance of synthesis of other organic compounds since purifications of the end products will normally and usually remove undesirable color contaminants. In the field of resin and plastic solvents, it is usually essential that the butyrolactone be colorless. Otherwise the resin or plastic will have imparted thereto a coloration which can usually not be tolerated from the commercial point of view in many of these plastics. In the manufacture of colorless sheets, films and fibers from cellulose triacetate and polyacrylonitrile, among others, the presence of undesirable color must be avoided. While butyrolactone has been received with wide acclaim as a specific solvent alone or in combination with other solvents for the aforementioned plastics, this compound suffers from the deficiency of forming an undesirable coloration upon long periods of storage and especially when subjected to somewhat elevated temperatures. Where butyrolactone is employed as a solvent for plastics, it is often subjected for considerable periods of time to elevated temperatures of the order of 100 to 250° C. Such elevated temperatures result in the formation of color bodies in the butyrolactone which readily manifest themselves by a decrease in the light transmission characteristics of the solvent.

It is therefore an object of the present invention to provide a process whereby butyrolactone may be stabilized to heat.

It is still another object of this invention to provide processes whereby butyrolactone may be stabilized against the formation of color bodies when subjected to elevated temperatures.

It is still another object of this invention to provide processes whereby butyrolactone is stable against color formation when subjected to heat.

It is a still further object of this invention to provide compositions comprising stabilized butyrolactone.

It is a still further object of this invention to provide stabilized compositions of butyrolactone.

It is a further object of this invention to provide stabilized compositions comprising butyrolactone whereby color formation is inhibited when the butyrolactone is subjected to heat or elevated temperatures.

Other objects will appear hereinafter as the description proceeds.

The aforementioned objects of the invention are achieved by the incorporation or addition to the butyrolactone of minor amounts of formaldehyde. Amounts as small as 0.01% produced marked improvements in stability. Up to about 2% by weight of formaldehyde based on the weight of the butyrolactone is deemed the practical upper limit thereof. The preferred range is from about 0.02% to about 1.0% formaldehyde by weight based on the weight of the butyrolactone. It is of course understood that larger amounts than those above set forth, under certain circumstances, may be used, but normally outstanding stabilization is effected within the described range. The formaldehyde may be added to the butyrolactone as an aqueous solution thereof which is ordinarily available as commercial formaldehyde of 37% strength. Other forms of formaldehyde, however, are equally suitable and may be used. These include the use of paraformaldehyde and other compounds yielding formaldehyde. To effect stabilization a selected minor amount of formaldehyde is merely added to the butyrolactone with which there is complete miscibility. Other ways of incorporating formaldehyde into the butyrolactone may be resorted to, for example, paraformaldehyde may be added to the still pot containing crude butyrolactone and upon distillation there results a codistillate of formaldehyde and butyrolactone.

Where formaldehyde is employed in diluted form, e.g., as an aqueous solution, it is of course understood that the amounts to be used must be translated in terms of the 100% formaldehyde limits given above. Thus, with 37% aqueous formaldehyde, the lower limit is of the order of 0.03% and the upper limit of 2% translates itself to one of about 6% for the aqueous formaldehyde.

It is completely unexpected that formaldehyde would exhibit any stabilizing action upon the butyrolactone since it is well known that aldehydes in general and formaldehyde in particular actually promote the formation of color bodies in many commercial products where such aldehydes are present as by-product impurities. The removal of such aldehyde impurities is usually essential to effect the production of a salable product. In the instant case, however, not only does the formaldehyde not cause color body promotion but on the contrary, actually is an excellent inhibitor of such formation.

The following examples will serve to illustrate the present invention without being deemed limitative thereof. In such examples, parts where mentioned shall be interpreted as parts by weight unless otherwise specified.

EXAMPLE 1

A sample of a crude technical grade butyrolactone is divided into six aliquot portions. To each of five of these portions there are added 0.1%, 0.3%, 0.5%, 1.0% and 3.0% by weight, respectively, of a 37% aqueous formaldehyde, and to the sixth sample no formaldehyde is added. Each of the samples is then heated in a glass stoppered flask for 3 hours at 150° C. To determine the degree of stability imparted by the addition of the formaldehyde, the percent light transmission at 400 millimicrons wave length of light is measured using water as the standard of comparison. With water taken as 100% transmission, the original unheated butyrolactone has a per cent transmission of 95%. The sample containing 0.1% of 37% formaldehyde (0.037% 100% formaldehyde) as a light transmisison of 82%. With 0.3% aqueous formaldehyde (0.11% formaldehyde) the transmission is 85%. With the sample containing 0.5% aqueous formaldehyde (0.18% formaldehyde) the transmission is 88%. With 1.0% aqueous formaldehyde (0.37% formaldehyde) the percent transmission is 91%. A sample containing 3% aqueous formaldehyde (1.1% formaldehyde) has a transmission of 92%. The last sample containing no formaldehyde gave a transmission of only 75%. This example demonstrates the outstanding degree of stabilization to color body formation effected by the use of relatively small amounts of formaldehyde. Due to the fact that in this example a relatively crude grade of butyrolactone has been tested, it has been necessary to employ somewhat more formaldehyde to achieve the requisite degree of stabilization.

EXAMPLE 2

The procedure of Example 1 is repeated except that a highly purified fraction distilled butyrolactone is employed. This sample before treatment has a light transmission of 100% as compared to clear water. After the heat treatment described in Example 1, the sample containing no formaldehyde is found to have a transmission of only 87%. In the following table are the transmission values of the other four samples containing formaldehyde.

Table 1

| Additive, percent | | Transmission |
|---|---|---|
| Aqueous formaldehyde (37%) | 100% HCHO | |
| 0.1 | 0.037 | 96.3 |
| 0.3 | 0.11 | 98.0 |
| 0.5 | 0.18 | 98.9 |
| 1.0 | 0.37 | 99.5 |
| 3.0 | 1.1 | 99.5 |

From the above data it will be observed that even though the sample tested is one of a highly purified nature, it nevertheless degraded seriously upon exposure to heat in the aforementioned test as evidenced by the 87% transmission. However, due to the purity of this butyrolactone, excellent stabilization has been achieved even with as little as 0.1% aqueous formaldehyde (0.037% formaldehyde on a 100% basis). With 1% aqueous formaldehyde, for all practical purposes, the sample can be considered as good as the original unheated product. Greater amounts of formaldehyde, it will be observed, did not effect any improved result.

EXAMPLE 3

Two samples of a crude unpurified technical grade butyrolactone having an initial transmission of 95% are to be distilled. To the still pot of one of these there is added 0.1% paraformaldehyde. After distillation, the sample distilled from the paraformaldehyde has a light transmission of 93% while the other sample has a transmission of only 87%.

EXAMPLE 4

Example 2 is repeated employing the following concentration of formaldehyde:

| Additive, percent | | Transmission |
|---|---|---|
| Aqueous formaldehyde (37%) | 100% HCHO | |
| 0.03 | 0.01 | 94.5 |
| 0.06 | 0.02 | 95.5 |
| 2.0 | 0.7 | 99.5 |
| 4.0 | 1.5 | 99.6 |
| 6.0 | 2.2 | 99.6 |

This example demonstrates the effective stabilization with as little as 0.01% formaldehyde, and again the unpredictability in this instance of more than about 1% to achieve maximum stabilization.

Other variations in and modifications of the described processes which will be obvious to those skilled in the art can be made in this invention without departnig from the scope or spirit thereof.

We claim:

1. A composition consisting essentially of butyrolactone and from about 0.01% to about 2.0% formaldehyde, all on a weight basis.

2. A composition stabilized against color body formation by heat consisting essentially of butyrolactone and from about 0.03% to about 5% of 37% formaldehyde.

3. A composition consisting essentially of butyrolactone and from about 0.01% to about 2.0% paraformaldehyde.

4. A composition stabilized to heat consisting essentially of butyrolactone and formaldehyde in heat stabilizing amounts.

5. A method for stabilizing butyrolactone to heat comprising adding thereto a stabilizing amount of formaldehyde.

6. A method as defined in claim 5 wherein the amount of formaldehyde is from about 0.01% to about 2% by weight based on the weight of the butyrolactone.

7. A method as defined in claim 6 wherein the formaldehyde employed in an aqueous formaldehyde.

8. A method as defined in claim 7 wherein the aqueous formaldehyde employed is a 37% aqueous formaldehyde.

No reference cited.